(12) United States Patent
Lemonnier et al.

(10) Patent No.: US 12,305,515 B2
(45) Date of Patent: May 20, 2025

(54) DEVICE FOR SEALING AND REINJECTING A BYPASS FLOW FOR A TURBINE NOZZLE

(71) Applicant: SAFRAN AIRCRAFT ENGINES, Paris (FR)

(72) Inventors: Jérôme Claude George Lemonnier, Moissy-Cramayel (FR); Franck Davy Boisnault, Moissy-Cramayel (FR); Antoine Bruno Van Noort, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/552,853

(22) PCT Filed: Mar. 29, 2022

(86) PCT No.: PCT/FR2022/050584
§ 371 (c)(1),
(2) Date: Sep. 27, 2023

(87) PCT Pub. No.: WO2022/208018
PCT Pub. Date: Oct. 6, 2022

(65) Prior Publication Data
US 2024/0368993 A1    Nov. 7, 2024

(30) Foreign Application Priority Data
Mar. 31, 2021   (FR) ...................... 2103343

(51) Int. Cl.
*F01D 11/00* (2006.01)
*F01D 5/08* (2006.01)
*F01D 9/06* (2006.01)

(52) U.S. Cl.
CPC ............ *F01D 11/001* (2013.01); *F01D 9/065* (2013.01); *F05D 2230/10* (2013.01); *F05D 2240/55* (2013.01)

(58) Field of Classification Search
CPC ........ F01D 11/001; F01D 9/065; F01D 25/12; F01D 5/081; F01D 11/02; F01D 5/187;
(Continued)

(56) References Cited

U.S. PATENT DOCUMENTS 3,945,758 A * 3/1976 Lee .......................... F01D 5/187
  415/115
4,309,147 A * 1/1982 Koster .................... F01D 25/32
  416/198 A
(Continued)

FOREIGN PATENT DOCUMENTS

| CN | 110273712 A | 9/2019 |
| DE | 102013011350 A1 | 1/2015 |
| FR | 3027343 A1 | 4/2016 |

OTHER PUBLICATIONS

International Search Report for PCT-FR2022-050584 dated Jul. 20, 2022.
Written Opinion for PCT-FR2022-050584 dated Jul. 20, 2022.

*Primary Examiner* — Eric J Zamora Alvarez
(74) *Attorney, Agent, or Firm* — McDonald Hopkins LLC

(57) ABSTRACT

A turbine comprising a sealing device connected to a nozzle with a radial degree of freedom. The sealing device comprises a reinjection pipe configured to collect a fluid present in a cavity which is located between tongues and is formed by the sealing device, and to reinject the fluid collected in this way into a main duct with a speed which has a large axial component.

10 Claims, 5 Drawing Sheets

(58) Field of Classification Search
CPC ...... F01D 17/162; F01D 5/082; F01D 11/005;
F01D 9/04; F01D 9/041; F01D 11/008;
F01D 5/06; F01D 5/084; F01D 5/143;
F01D 5/145; F01D 11/06; F01D 11/025;
F01D 11/12; F01D 11/08; F01D 5/02;
F01D 5/025; F01D 5/066; F01D 5/188;
F01D 5/189; F01D 5/225; F01D 5/3015;
F01D 5/3053; F05D 2240/81; F05D
2220/32; F05D 2230/10; F05D 2240/55;
F05D 2260/22141; F05D 2240/11; F05D
2240/24; F04D 29/322; F05B 2240/801

See application file for complete search history.

(56) References Cited

U.S. PATENT DOCUMENTS

| | | | | |
|---|---|---|---|---|
| 4,545,725 | A * | 10/1985 | Ikeda | F01D 11/04 |
| | | | | 415/176 |
| 5,358,374 | A * | 10/1994 | Correia | F01D 5/081 |
| | | | | 415/115 |
| 6,077,034 | A * | 6/2000 | Tomita | F01D 5/08 |
| | | | | 415/110 |
| 6,109,867 | A * | 8/2000 | Jacques Portefaix | |
| | | | | F01D 11/001 |
| | | | | 415/110 |
| 6,217,279 | B1 * | 4/2001 | Ai | F01D 11/001 |
| | | | | 415/110 |
| 6,398,485 | B1 * | 6/2002 | Frosini | F01D 5/08 |
| | | | | 415/137 |
| 6,481,959 | B1 * | 11/2002 | Morris | F01D 5/143 |
| | | | | 415/115 |
| 6,546,735 | B1 * | 4/2003 | Moniz | F01D 21/003 |
| | | | | 60/773 |
| 6,655,920 | B2 * | 12/2003 | Beutin | F01D 11/008 |
| | | | | 416/198 A |
| 6,832,891 | B2 * | 12/2004 | Aschenbruck | F01D 11/001 |
| | | | | 415/115 |
| 8,011,881 | B1 * | 9/2011 | Liang | F01D 5/187 |
| | | | | 415/115 |
| 8,206,090 | B2 * | 6/2012 | Cloarec | F01D 17/162 |
| | | | | 415/230 |
| 8,382,432 | B2 * | 2/2013 | Grissino | F01D 11/001 |
| | | | | 415/199.5 |
| 9,188,008 | B2 * | 11/2015 | Coutandin | F01D 11/001 |
| 9,297,308 | B2 * | 3/2016 | Tsutsumi | F01D 11/06 |
| 10,544,685 | B2 * | 1/2020 | Takamura | F01D 5/082 |
| 10,626,797 | B2 * | 4/2020 | Namadevan | F04D 29/542 |
| 10,677,080 | B2 * | 6/2020 | Klingels | F02C 7/28 |
| 11,098,604 | B2 * | 8/2021 | Boursy | F01D 5/06 |
| 11,299,989 | B2 * | 4/2022 | Blanchard | F01D 5/066 |
| 12,000,308 | B2 * | 6/2024 | Chaudhari | F01D 5/225 |
| 2015/0010385 | A1 | 1/2015 | Oyarbide et al. | |
| 2019/0284946 | A1 * | 9/2019 | Berdowski | F01D 11/20 |

* cited by examiner

DEVICE FOR SEALING AND REINJECTING A BYPASS FLOW FOR A TURBINE NOZZLE

CROSS-REFERENCE TO RELATED APPLICATIONS

This is the National Stage application of PCT international application PCT/FR2022/050584, filed on Mar. 29, 2022, which claims the priority of French Patent Application No. 2103343, filed Mar. 31, 2021, both of which are incorporated herein by reference in their entireties.

TECHNICAL FIELD

The invention relates to the field of turbine engine turbines, in particular for an aircraft propulsion unit.

PRIOR ART

A conventional turbine engine turbine comprises one or more stage(s) each formed by a nozzle and a movable wheel equipped with platforms which radially delimit therebetween a main flow path for the flow of a fluid. The nozzle of one stage is configured so as to accelerate the fluid and deflect it in the direction of the vanes of the movable wheel of the same stage to drive the latter in rotation.

In order to reduce the flow rate of the flow path fluid which tends to bypass such a nozzle out of the main flow path, it is known to mount a sealing device at the root of the nozzle as described in the document FR3027343A1.

The bypass fluid, generally called "bypass", which passes through such a sealing device returns back to the main flow path while generating mixing losses, thereby reducing the performance and the efficiency of the turbine.

DISCLOSURE OF THE INVENTION

In order to improve the performance and the efficiency of a turbine engine turbine, an object of the invention is a turbine engine nozzle extending around a longitudinal axis and comprising a platform, a blade extending radially with respect to the longitudinal axis outwards from the platform, a main flange extending radially inwards from the platform, an abradable element and a support element carrying the abradable element, the support element comprising a flange connected to said main flange, the abradable element being intended to be arranged opposite two wipers carried by a rotor of the turbine engine and which define therebetween an inter-wiper cavity. According to the invention, the nozzle comprises a reinjection duct comprising an inlet configured to open out into the inter-wiper cavity and an outlet formed at a radially outer end of the flange of the support element and configured to open out into a cavity extending axially downstream of the nozzle, the reinjection duct comprising a section extending in the flange of the support element.

In operation, a bypass fluid enters the inter-wiper cavity. Under the action of the differential pressure between the inter-wiper cavity and the cavity downstream of the nozzle, which is connected to the main flow path, a portion of the bypass fluid passes through the reinjection duct.

The positioning of the outlet of the duct at the radially outer end of the flange of the support element allows reinjecting the bypass fluid into the main flow path radially proximate to the main flow path.

Thus, the invention allows reducing mixing losses, which allows increasing the performance and the efficiency of the turbine.

The invention also allows simplifying the manufacture of the nozzle and in particular the machining of the reinjection duct.

Preferably, said section of the reinjection duct is straight.

In one embodiment, the reinjection duct comprises an inlet section passing through the abradable element.

Preferably this inlet section is straight.

In general, the presence of straight sections in the reinjection duct allows simplifying machining thereof.

In one embodiment, the inlet section defines an inlet direction perpendicular to said outlet direction, or forming with the latter an angle close to 90°.

In one embodiment, the reinjection duct comprises an outlet section axially extending. Thus, the axial orientation of the outlet section allows reinjecting the bypass fluid into the main flow path so as to minimise mixing losses with the fluid that circulates in the main flow path.

The outlet section of the reinjection duct may have an outlet direction parallel to the longitudinal axis, in order to maximise the axial component of the speed of the reinjected flow.

Alternatively, the outlet direction may be oblique with respect to the longitudinal axis so that the outlet section extends both axially and radially. In this case, the angle between the outlet direction and the longitudinal axis, considered in a plane passing both through the longitudinal axis and through a point of intersection of the outlet direction with the outlet section of the reinjection duct, is preferably relatively small, for example smaller than 20°, so that the radial component is relatively small compared to the axial component of the velocity of the reinjected flow.

In one embodiment, said outlet section of the reinjection duct extends tangentially with respect to the longitudinal axis.

The tangential orientation of the outlet section allows reinjecting the bypass fluid into the main flow path while increasing the tangential component of the speed of the fluid coming out of the reinjection duct, in the same gyratory direction as the fluid main flow circulating in the main flow path.

This allows further reducing the mixing losses and consequently increasing the performance and the efficiency of the turbine.

In one embodiment, the outlet section of the reinjection duct has a section which decreases towards the outlet.

Thus, the outlet section may form a cavity converging towards the outlet, allowing accelerating the flow coming out of the reinjection duct.

Preferably, the cross-section of the outlet section decreases towards the outlet in a monotonous manner.

In one embodiment, the flange of the support element comprises a downstream surface and an element projecting from this downstream surface and forming the outlet section of the reinjection duct.

This element may be an element affixed on or integrally made with said flange in one-piece.

In one embodiment, the support element is connected to said main flange so as to enable a radial movement of the support element relative to this main flange.

In one embodiment, said flange of the support element is a downstream flange, the support element comprising an upstream flange, said main flange of the nozzle extending axially between the upstream flange and the downstream flange of the support element. In one embodiment, the nozzle comprises a thermal protection sheet metal fastened on the downstream flange of the support element.

In a variant of this embodiment, the nozzle also comprises another heat protection sheet metal fastened on the upstream flange of the support element so that the reinjection duct extends axially between these two sheet metals.

In one embodiment, the blade has a trailing edge defining a line in the continuation of which the outlet of the reinjection duct extends.

In other words, the outlet of the reinjection duct may be placed in the wake of the trailing edge of the blade, substantially in line with the latter.

The pressure in the wake of the trailing edge of the blade is lower than in circumferentially adjacent regions, i.e. extending circumferentially between the trailing edges of two adjacent blades.

Positioning the outlet of the reinjection duct in the wake of the trailing edge of the blade allows increasing the pressure difference between the inlet and the outlet of the duct. In one embodiment, the support element of the sealing device is annular. Another object of the invention is a turbine for a turbine engine, comprising a nozzle as defined hereinabove.

In one embodiment, the turbine is a low-pressure turbine.

In one embodiment, the turbine comprises a movable wheel extending axially downstream of the nozzle, the movable wheel comprising a spoiler, the outlet of the reinjection duct of the nozzle opening out radially above said spoiler.

Another object of the invention is a turbine engine for an aircraft propulsion system, comprising such a turbine.

According to another aspect, an object of the invention is a method for manufacturing a nozzle as defined hereinabove.

In one embodiment, the method comprises a step of machining the support element of the sealing device so as to form the reinjection duct.

Other advantages and features of the invention will appear upon reading the detailed, non-limiting description that follows.

BRIEF DESCRIPTION OF THE DRAWINGS

The following detailed description refers to the appended drawings wherein.

DETAILED DESCRIPTION OF SOME EMBODIMENTS

The figures comprise a reference frame L, R and C respectively defining longitudinal/axial, radial and circumferential/tangential directions orthogonal to each other.

Figure 1:
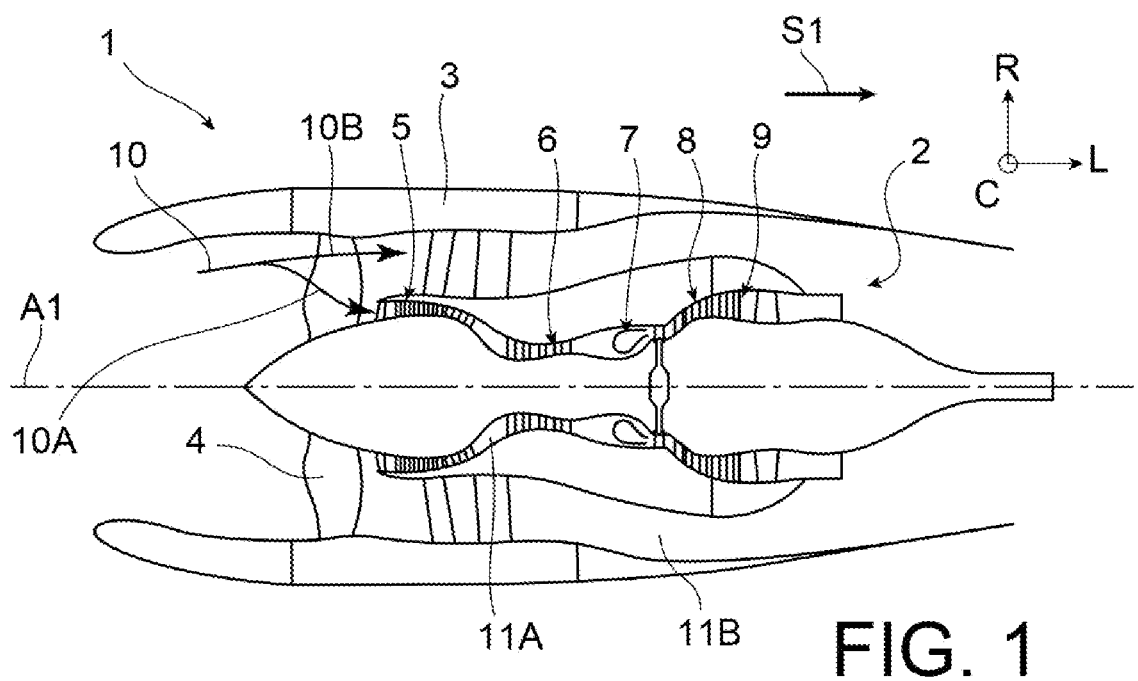
FIG. 1 is a schematic longitudinal sectional view of an aircraft propulsion unit.

FIG. 1 shows an aircraft propulsion unit 1 comprising a turbine engine 2 faired by a nacelle 3. In this example, the turbine engine 2 is a twin-spool turbofan engine.

The terms "upstream" and "downstream" will hereafter be defined with respect to a direction S1 of gas flow through the propulsion unit 1 when it is propelled.

The turbofan engine 2 has a longitudinal central axis A1 about which the various components thereof extend, in this case, from upstream to downstream, a fan 4, a low-pressure compressor 5, a high-pressure compressor 6, a combustion chamber 7, a high-pressure turbine 8 and a low-pressure turbine 9. The compressors 5 and 6, the combustion chamber 7 and the turbines 8 and 9 form a gas generator.

In operation, an air flow 10 enters the propulsion unit 1 via an air inlet upstream of the nacelle 3, passes through the fan 4 and then splits into a central primary flow 10A and a secondary flow 10B. The primary flow 10A flows in a main gas flow path 11A passing through the gas generator. In turn, the secondary flow 10B flows in a secondary flow path 11B surrounding the gas generator and delimited radially outwards by the nacelle 3.

Figure 2:
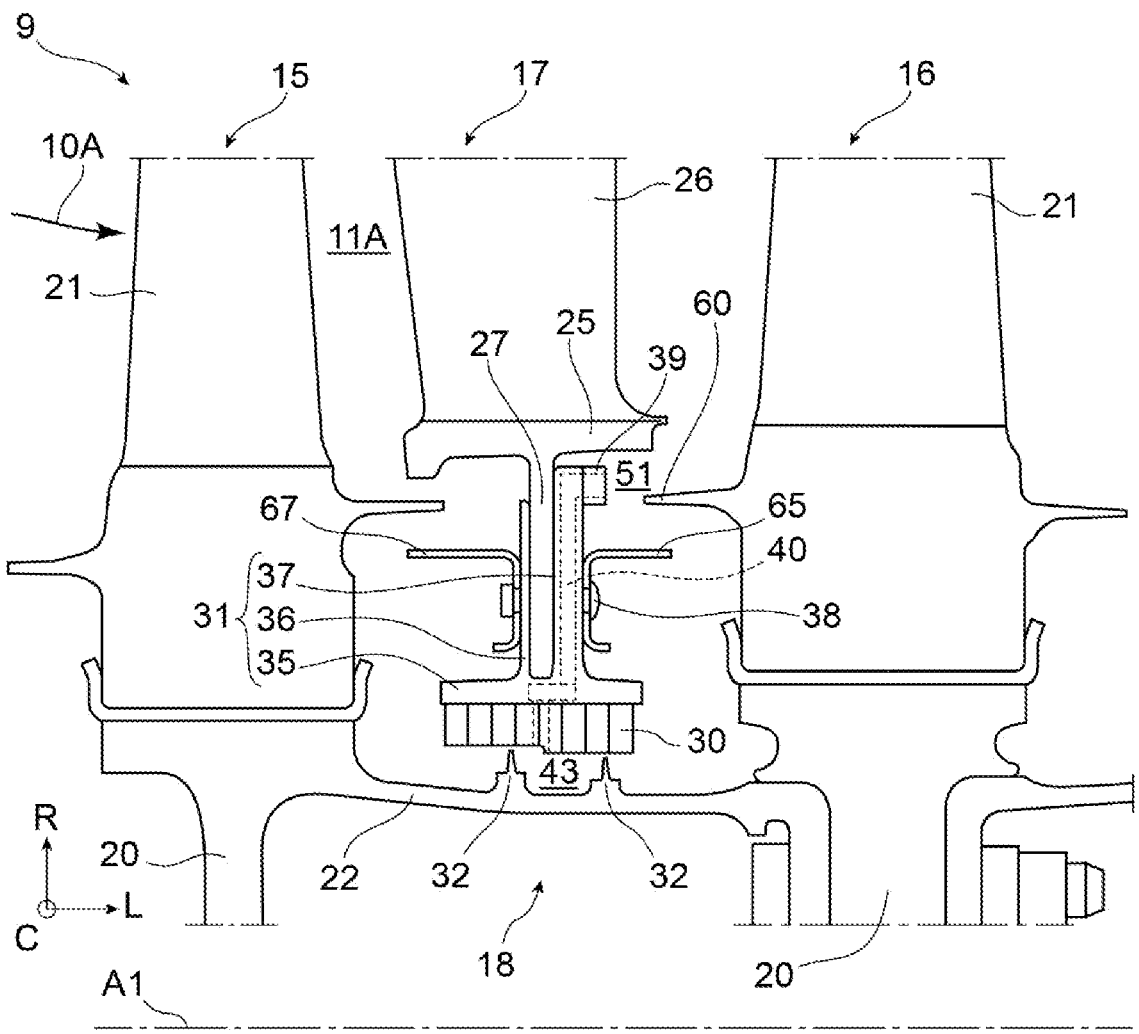
FIG. 2 is a partial schematic longitudinal sectional half-view of a turbine of a turbine engine according to the invention.

The low-pressure turbine 9, partially shown in FIG. 2, is configured to recover part of the combustion energy in order to drive the movable wheels forming the rotor of the turbine 9 in rotation around the axis A1. Between each pair of adjacent movable wheels, the turbine 9 comprises a bladed stator crown forming a guide vane assembly. FIG. 2 partially shows two movable wheels 15 and 16 and the turbine 9.

The nozzle 17 extends axially between the movable wheel 15 forming an upstream wheel and the movable wheel 16 forming a downstream wheel.

In a manner known per se, each of the movable wheels 15 and 16 comprises a disc 20 and blades 21 carried by the disc 20.

In this example, the disc 20 of the upstream wheel 15 comprises a shroud 22 extending axially in the direction of the downstream wheel 16, radially inside the guide vane assembly 17. A downstream end of the shroud 22 is connected to the disc 20 of the downstream wheel 16 so as to secure together the wheels 15 and 16 rotating around the axis A1 to one another.

In this example, the nozzle 17 comprises several sectors arranged circumferentially end-to-end so as to form together said bladed crown.

In a manner known per se, each sector of the nozzle 17 comprises a platform 25 delimiting radially inwards a portion of the main flow path 11A, blades 26 extending radially outwards from the platform 25 and being circumferentially spaced apart around the axis A1, as well as a flange 27 extending radially inwards from the platform 25.

The nozzle 17 also comprises a sealing device 18 including an abradable element 30, also called a wear part, a support element 31 and two wipers 32.

Each of the abradable element 30, the support element 31 as well as the wipers 32 forms an annular part with an axis A1.

The support element 31 comprises an axial portion 35 as well as an upstream flange 36 and a downstream flange 37 each extending radially outwards from the axial portion 35. The axial portion 35 of the support element 31 defines an inner surface on which the abradable element 30 is fastened.

The flanges 36 and 37 of the support element 31 define axially therebetween a space receiving the flange 27 of each sector of the nozzle 17. The width of this space corresponds substantially to that of the flange 27 of each sector so as to block the axial position of the support element 31 with respect to the nozzle 17.

In this example, the position of the support element 31 is also locked circumferentially but is free to move radially with respect to the flange 27 of the nozzle 17.

To do so, the flange 27 of each sector of the nozzle 17 comprises in this example a radial bore in which a pin 38 can slide radially tightly mounted in a corresponding orifice of each of the flanges 36 and 37.

Of course, several pins distributed around the axis A1 may be implemented and cooperate with the flanges 27, 36 and 37 similarly for each of the sectors of the nozzle 17.

Thus, the support element 31 is connected to the flange 27 so as to enable a relative radial movement thereof relative to one another, it being understood that this freedom of movement may be ensured by any other sliding means.

In the example of FIG. 2, the wipers 32 of the sealing device 18 are carried by the shroud 22.

In operation, the movable wheels 15 and 16 are driven in rotation around the axis A1, which causes a friction of the wipers 32 on the abradable element 30, which in this example has a honeycomb structure.

Thus, the device 18 ensures a dynamic sealing reducing the phenomenon of bypass of the primary flow 10A radially inside the nozzle 17.

The nozzle 17 of FIG. 2 also comprises thermal protection sheet metals 65 and 67 carried by the flanges 37 and 36 respectively.

More specifically, the invention relates to a means for reinjecting into the main flow path 11A a portion of the bypass flow passing through the sealing device 18.

Figure 3:
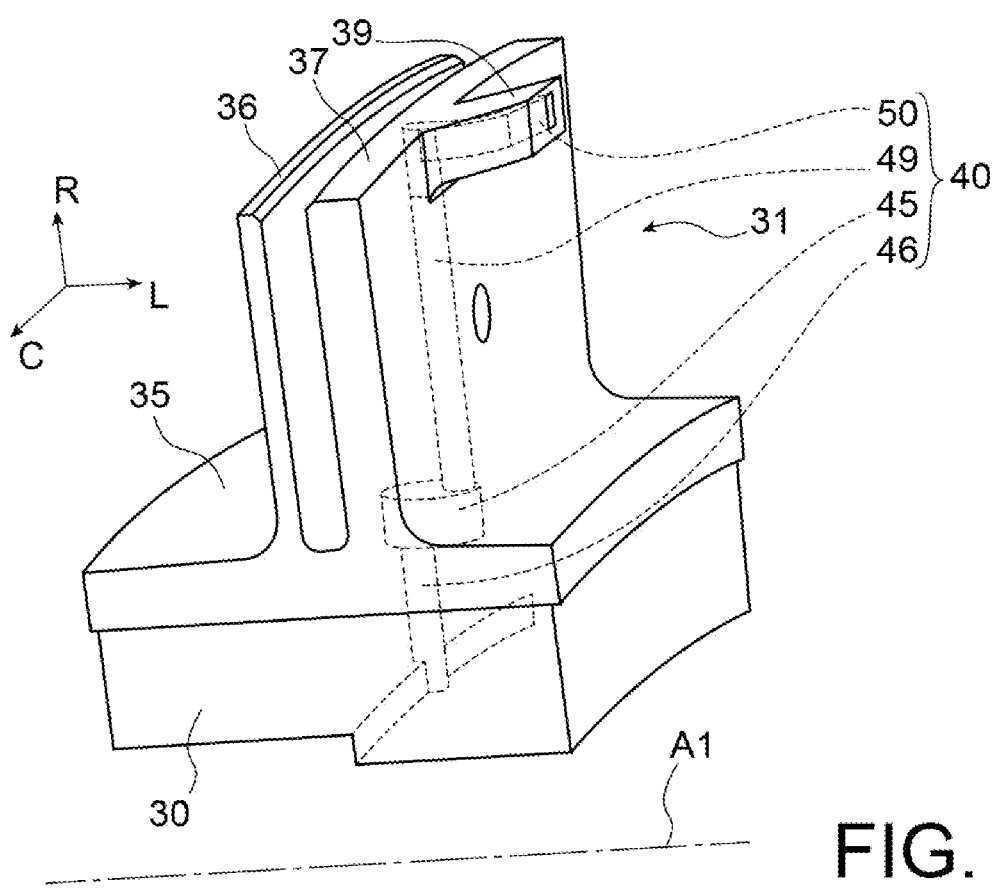
FIG. 3 is a schematic perspective view of a circumferential portion of a sealing device in accordance with the invention, showing a support element and an abradable element which form a reinjection duct.
Figure 4:
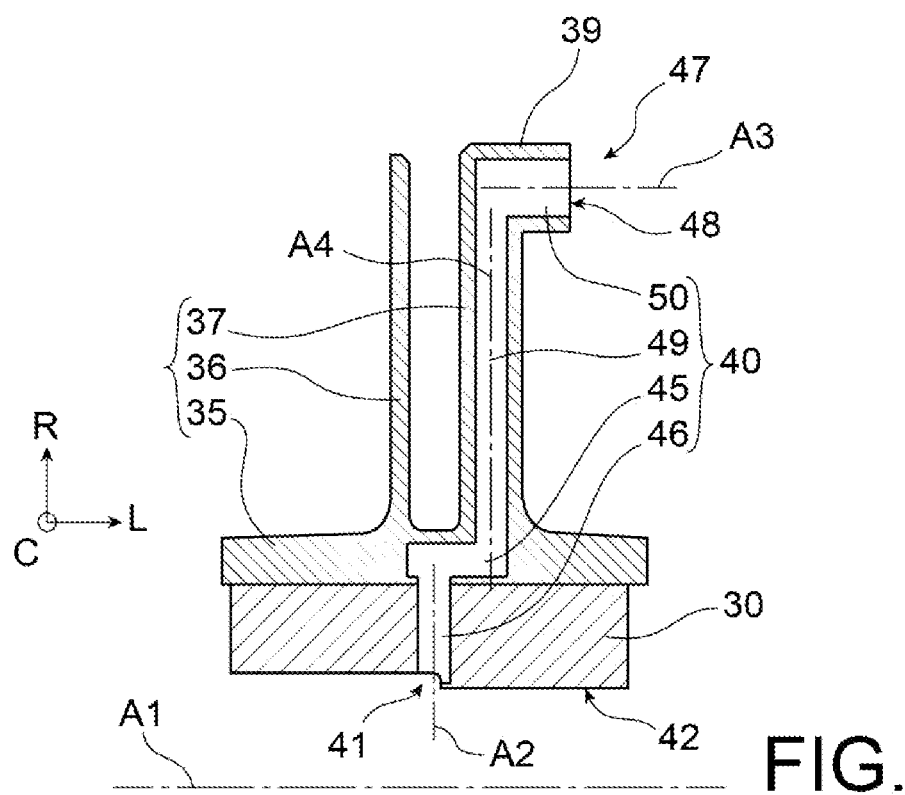
FIG. 4 is a schematic longitudinal sectional view of the sealing device of FIG. 3, according to a sectional plane passing through a portion of the reinjection duct.

In the embodiment of FIGS. 2 to 4, the sealing device 18 forms a reinjection duct 40 passing through the abradable element 30 and the support element 31.

The duct 40 comprises an inlet 41 opening onto an inner surface 42 of the abradable element 30 which corresponds in this case to a friction surface of the wipers 32.

Axially, the inlet 41 of the duct 40 extends between the two wipers 32 so as to open into an inter-wiper cavity 43, which is delimited axially upstream by one of the wipers 32, axially downstream by the other wiper 32, radially inwards by the shroud 22 and radially outwards by the abradable element 30 (cf. FIG. 2).

From the inlet 41, the duct 40 extends radially throughout the abradable element 30 up to an intermediate cavity 45 formed in the axial portion 35 of the support element 31.

The portion of the duct 40 extending between the inlet 41 and this intermediate cavity 45 forms a straight inlet section 46 having in this example an axis A2 perpendicular to the axis A1.

In the embodiment of FIGS. 3 and 4, the support element 31 comprises an element 39 forming a protuberance which projects axially from the downstream flange 37 at one end of this flange 37 radially opposite the axial portion 35.

The duct 40 comprise an outlet 47 opening onto a downstream surface 48 of the protuberance 39 and consequently at a radially outer end of the flange 37.

Between the intermediate cavity 45 and the outlet 47, the duct 40 comprises a straight section 49 extending radially through the downstream flange 37 and an outlet section 50 extending axially and tangentially through the protuberance 39.

In this example, the outlet section 50 has an axis A3 parallel to the axis A1 and perpendicular to the axis A2 as well as to an axis A4 of the section 49.

Figure 5:
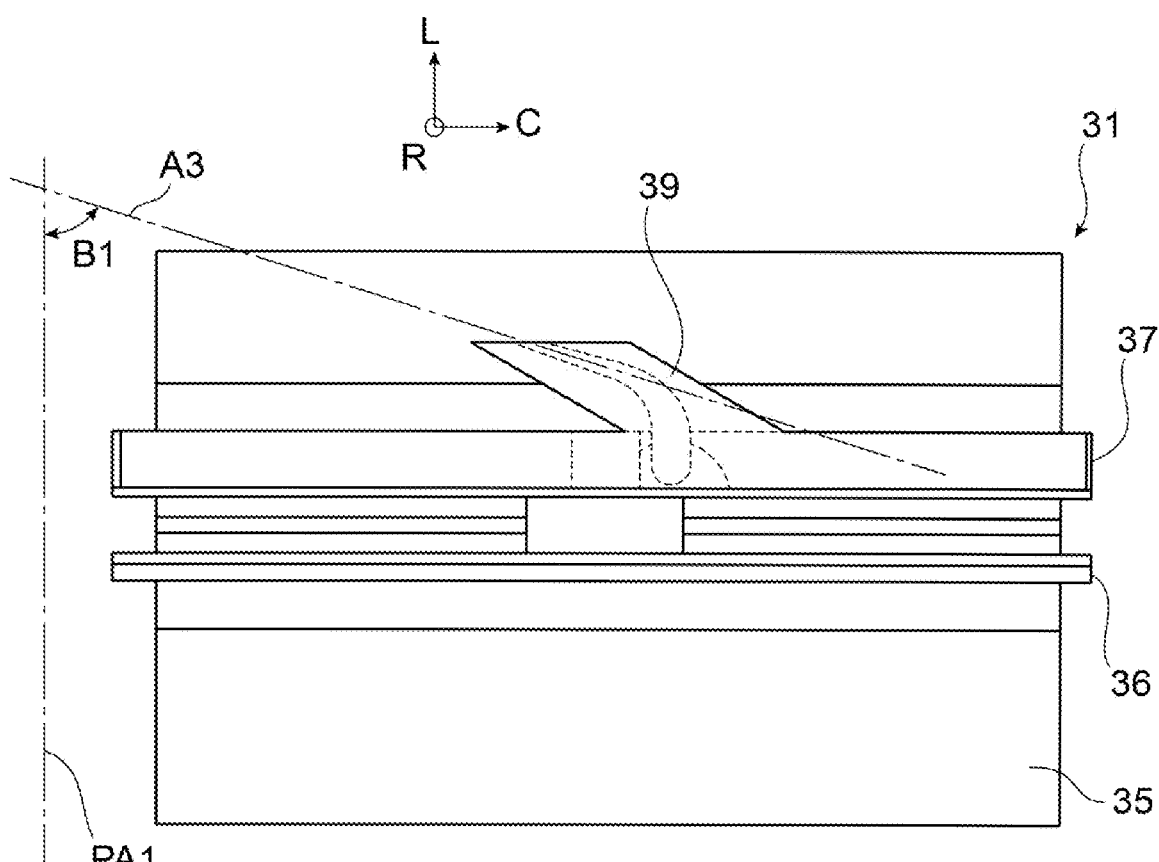
FIG. 5 is a schematic view of a circumferential portion of the support element of the sealing device of FIG. 3.

Referring to FIGS. 3 and 5, the protuberance 39 forming the outlet section 50 of the duct 40 is oriented according to the circumferential direction so that the axis A3 intersects a plane PA1 containing the axis A1.

In this example, the axis A3 and the plane PA1 form an angle B1 comprised between 40° and 90°.

Given this circumferential orientation of the outlet section 50, the inlet 41 and the outlet 47 of the duct 40 have a different circumferential position with respect to each other around the axis A1.

Referring to FIG. 2, the protuberance 39 is configured so that the outlet 47 of the duct 40 opens into a cavity 51 extending downstream of the flange 27 of the nozzle 17 and being fluidically connected to the main flow path 11A.

In this example, the outlet 47 of the duct 40 opens out radially above a spoiler 60 of the movable wheel 16, this spoiler 60 extending forwards of the movable wheel 16 axially in the direction of the nozzle 17.

Under the action of the differential pressure between this cavity 51 and the inter-wiper cavity 43, a portion of the bypass fluid present in the inter-wiper cavity 43 is sucked into the duct 40 via the inlet 41 and is discharged through the outlet 47.

Thus, this fluid portion is reinjected into the cavity 51 and therefore into the main flow path 11A so as to have a speed having a large axial component as well as a tangential component, which allows significantly reducing mixing losses.

In order to accelerate the fluid coming out of the reinjection duct 40, the outlet section 50 of the reinjection duct 40 has a section which decreases monotonously towards the outlet 47, thereby forming a convergent outlet cavity.

In this example, the protuberance 39 is configured so that the outlet 47 of the reinjection duct 40 extends in the continuation of the trailing edge of one of the blades 26 of the nozzle 17, in order to accentuate the pressure difference between the cavities 43 and 51.

Of course, the invention is not limited to the above-described examples and embodiments, the latter also covering, in particular, many geometries of the reinjection duct 40 and/or of the support element 31 and/or of the abradable element 30 and/or of the wipers 32 and/or of the relative position of these different members with respect to one another.

For example, the sections 46 and/or 49 and/or 50 of the reinjection duct 40 may have a section with a circular or ovoid or rectangular shape.

In embodiments that are not shown, the sealing device comprises more than two wipers and the reinjection duct has an inlet opening into a cavity delimited by a first one and a second one of said wipers and/or an inlet opening into a cavity delimited by the second one and by a third one of said wipers.

Moreover, the device may comprise several reinjection ducts 40 such as that one described hereinabove, which may for example be circumferentially distributed around the axis A1 so as to extend each under a respective blade 26 of the nozzle 17. In addition, the invention may be implemented in a turbine different from the above-described one, for example within the high-pressure turbine 8.

Finally, it should be recalled that the support element 31 is connected to the flange 27 so as to enable a relative radial movement thereof relative to one another, it being understood that this freedom of movement may be ensured by any other sliding means.

Thus, a dissociation is achieved between, on the one hand, the angular sectors of the nozzle comprising the platform sectors 25, the blades 26 and the main flanges 27 and, on the other hand, the assembly comprising the abradable element 30 and the element support 31 carrying this abradable element, both preferably annular and non-sectorised, and for example made in one-piece. This embodiment prevents leakages in the intersector spaces of the nozzle, thanks to the annular and non-sectorised nature of the aforementioned elements. Thus, the main blade flanges 27 are fitted between the elements 36 and 37, and can move radially without driving the annular and non-sectorised elements. Thus, the radial movements of these distinct assemblies are advantageously dissociated.

In the invention, the position of the reinjection duct 40 is therefore independent of the radial movements of the blades and of the nozzle angular sectors integrating these blades. This allows controlling leakages in the intersector spaces, as well as leakages at the labyrinth seal integrating the wipers 32.

What is claimed is:

1. A turbine engine nozzle extending around a longitudinal axis, the nozzle comprising:
    a platform,
    a blade extending radially with respect to the longitudinal axis outwards from the platform,
    a main flange extending radially inwards from the platform,
    an abradable element,
    a support element carrying the abradable element,
    wherein the support element comprises a flange connected to said main flange to enable a relative radial movement relative to one another,
    wherein the abradable element is arranged opposite two wipers carried by a rotor of the turbine engine and which define therebetween an inter-wiper cavity, and
    a reinjection duct comprising:
    an inlet configured to open out into the inter-wiper cavity, and
    an outlet formed at a radially outer end of the flange of the support element and configured to open out into a cavity extending axially downstream of the nozzle, and
    a section extending in the flange of the support element.

2. The nozzle according to claim 1, wherein said section of the reinjection duct is straight.

3. The nozzle according to claim 1, wherein the reinjection duct comprises a straight inlet section passing through the abradable element.

4. The nozzle according to claim 1, wherein the reinjection duct comprises an outlet section extending axially with respect to the longitudinal axis.

5. The nozzle according to claim 4, wherein the flange of the support element comprises a downstream surface and an element projecting from the downstream surface and forming the outlet section of the reinjection duct.

6. The nozzle according to claim 1, wherein said flange of the support element is a downstream flange, the support element comprising an upstream flange, said main flange of the nozzle extending axially between the upstream flange and the downstream flange of the support element.

7. The nozzle according to claim 6, comprising a thermal protection sheet metal fastened on the downstream flange of the support element and another thermal protection sheet metal fastened on the upstream flange of the support element so that the reinjection duct extends axially between these two sheet metals.

8. A turbine for a turbine engine, comprising the nozzle according to claim 1.

9. The turbine according to claim 8, comprising a movable wheel extending axially downstream of the nozzle, the movable wheel comprising a spoiler, the outlet of the reinjection duct of the nozzle opening out radially above the spoiler.

10. A method for manufacturing the nozzle according to claim 1, comprising a step of machining the support element so as to form the reinjection duct.

* * * * *